(12) United States Patent
Liu et al.

(10) Patent No.: US 8,207,941 B2
(45) Date of Patent: Jun. 26, 2012

(54) LENS MODULE AND OPTICAL MOUSE USING THE SAME

(75) Inventors: Tien-Chia Liu, Hsinchu (TW); Hung-Ching Lai, Hsinchu (TW); Hui-Hsuan Chen, Hsinchu (TW)

(73) Assignee: Pixart Imaging Inc., Hsinchu (TW)

( * ) Notice: Subject to any disclaimer, the term of this patent is extended or adjusted under 35 U.S.C. 154(b) by 875 days.

(21) Appl. No.: 12/189,793

(22) Filed: Aug. 12, 2008

(65) Prior Publication Data
US 2009/0244008 A1 Oct. 1, 2009

(30) Foreign Application Priority Data

Mar. 27, 2008 (TW) ................................ 97205263 U

(51) Int. Cl.
G06F 3/033 (2006.01)
G09G 5/08 (2006.01)

(52) U.S. Cl. ........................ 345/166; 345/163; 345/156

(58) Field of Classification Search .................. 345/166, 345/163
See application file for complete search history.

(56) References Cited

U.S. PATENT DOCUMENTS

| 7,129,929 | B1 * | 10/2006 | Bohn | 345/166 |
| 7,615,733 | B2 * | 11/2009 | Koay et al. | 250/221 |
| 7,688,309 | B2 * | 3/2010 | Theytaz et al. | 345/166 |
| 7,764,271 | B2 * | 7/2010 | Kuo et al. | 345/166 |
| 2006/0232556 | A1 * | 10/2006 | Chien | 345/166 |
| 2007/0273654 | A1 * | 11/2007 | Chen | 345/166 |
| 2009/0027340 | A1 * | 1/2009 | Huang et al. | 345/163 |
| 2009/0267899 | A1 * | 10/2009 | Jeong et al. | 345/166 |

* cited by examiner

*Primary Examiner* — Nitin Patel
*Assistant Examiner* — Alecia D English
(74) *Attorney, Agent, or Firm* — Chun-Ming Shih

(57) ABSTRACT

In a lens module and an optical mouse using the lens module, the lens module includes a substrate, a light guide rod and a carrying base. The light guide rod is extended from the substrate along a predetermined direction and has a light incident surface. The carrying base is connected with the light incident surface and has a carrying surface for carrying a light source of the optical mouse. The substrate, the light guide rod and the carrying base are integrated into one piece. The lens module has lower cost.

16 Claims, 2 Drawing Sheets

LENS MODULE AND OPTICAL MOUSE USING THE SAME

BACKGROUND

1. Field of the Invention

The present invention relates to a pointing apparatus, and particularly to an optical mouse and a lens module thereof.

2. Description of Related Art

FIG. 1 is a schematic view of a lens module of a conventional optical mouse. Referring to FIG. 1, the lens module 100 of the conventional optical mouse includes a substrate 110 and three fixed rods 120, wherein the three fixed rods 120 extend from a light incident surface 112 of the substrate 110 along a predetermined direction. An accommodation space between the three fixed rods 120 is for accommodating a light source (not shown) of the optical mouse, and the light source is for providing a light beam to the light incident surface 112 of the substrate 110. In the conventional technique, the three fixed rods 120 are used to clip the light source to fix the light source.

In general, the lens module 100 is manufactured by injection molding, so the mold for molding the lens module 100 is needed to be designed before manufacturing the lens module 100. In the conventional technique, due to the lens module 100 having the three fixed rods 120 extended from the light incident surface 112 of the substrate 110, the structure of the mold is complicated and more sliding blocks are needed. Thus, the cost of the mold is expensive. Moreover, due to the structure of the module being complicated, the lens module 100 is not easy to be manufactured. Therefore, the time for manufacturing the lens module 100 is increased and the yield of the lens module 100 is reduced. In other words, the manufacturing cost of the convention lens module 100 is higher. Furthermore, the structure of each of the fixed rods 120 is weak due to its long and thin shape, and thus the fixed rods 120 are easily broken.

BRIEF SUMMARY

The present invention relates to a lens module to reduce the manufacturing cost.

The present invention further relates to an optical mouse to reduce the manufacturing cost.

To achieve the above-mentioned advantages, the present invention provides a lens module for an optical mouse. The lens module includes a substrate, a light guide rod and a carrying base. The light guide rod extends from the substrate along a predetermined direction and has a light incident surface. The carrying base is connected with the light incident surface and has a carrying surface for carrying a light source of the optical mouse. Further, the substrate, the light guide rod and the carrying base are integrated into one piece.

In an embodiment of the present invention, the light incident surface is substantially perpendicular to a bottom surface of the substrate.

In an embodiment of the present invention, the light guide rod has a lens disposed on the light incident surface.

In an embodiment of the present invention, the carrying surface is a curved surface.

In an embodiment of the present invention, the carrying base has a plurality of fixed pins disposed on the carrying surface.

To achieve the above-mentioned advantages, the present invention further provides an optical mouse including the above-mentioned lens module, a light source and the image sensing device. The light source is disposed on the carrying surface and the image sensing device is disposed on the substrate. The light source is for providing a light beam to the light guide rod, and the light beam is guided to a reflective surface outside the optical mouse by the light guide rod. The image sensing device is for sensing the light beam reflected from the reflective surface.

In an embodiment of the present invention, the optical mouse further includes a housing for accommodating the lens module, the light source and the image sensing device, wherein an upper cover of the housing has a protrusion, and the protrusion is leaned against the light source.

Comparing to the convention technique, in the lens module of the present invention, the structure of the element (i.e. the carrying base) for fixing the light source is simpler, and the manufacturing time is consequently reduced and the yield is consequently promoted. Therefore, the lens module and the optical mouse of the present invention have the advantage of low manufacturing cost.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
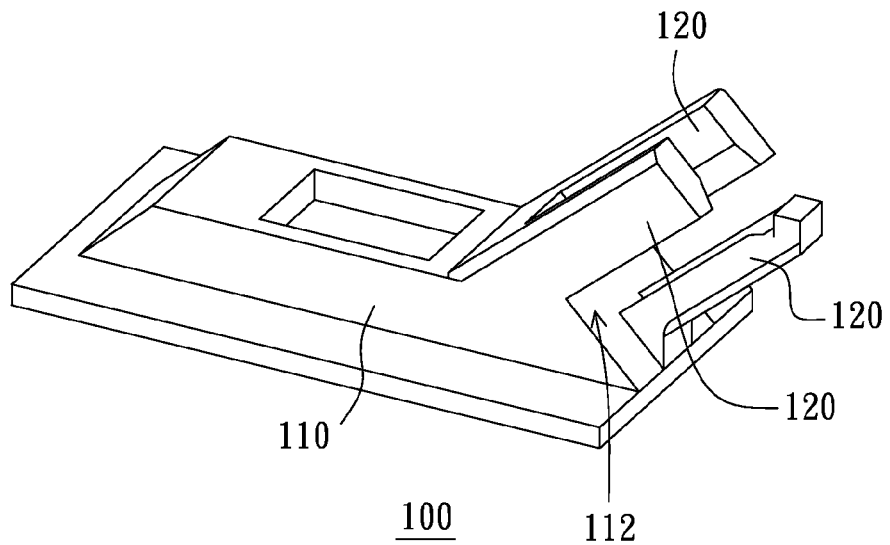
FIG. 1 is a schematic view of a lens module of a conventional optical mouse.
Figure 2:
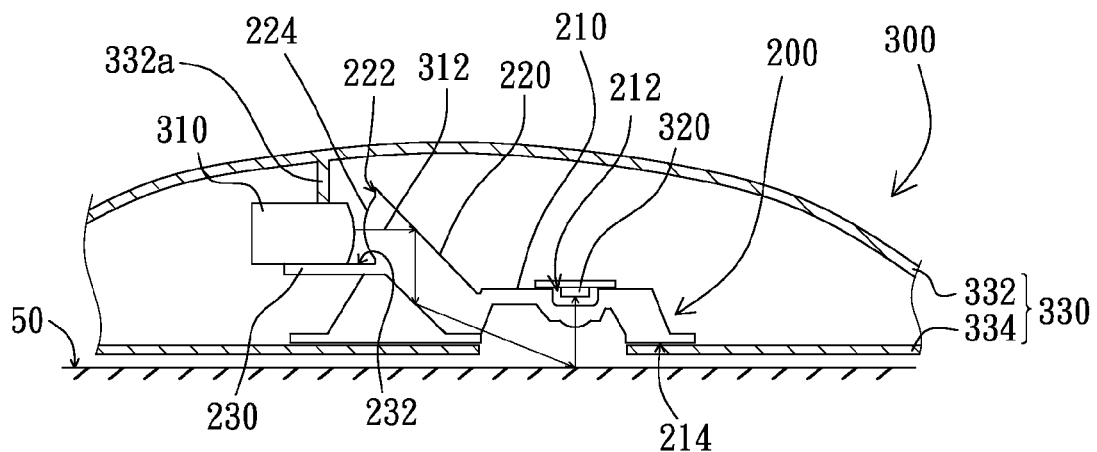
FIG. 2 is a schematic cross-section view of an optical mouse according to an embodiment of the present invention.
Figure 3:
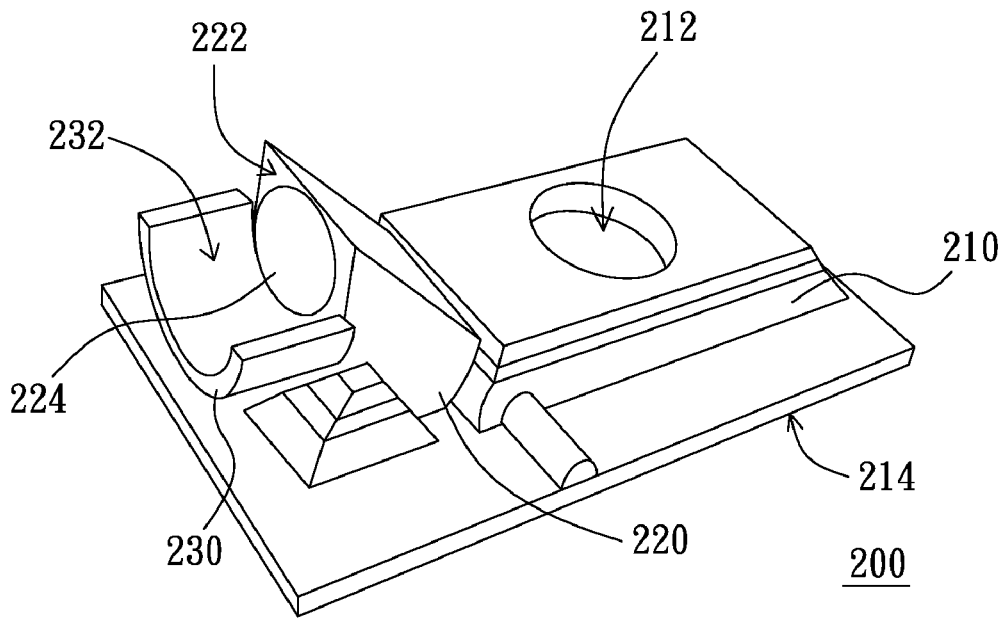
FIG. 3 is a schematic three-dimensional view of the lens module of FIG. 2.

FIG. 2 is a schematic cross-section view of an optical mouse according to an embodiment of the present invention, and FIG. 3 is a schematic three-dimensional view of the lens module of FIG. 2. Referring to FIGS. 2 and 3, the optical mouse 300 of the present embodiment includes a light source 310, an image sensing device 320 and a lens module 200. The lens module 200 includes a substrate 210, a light guide rod 220 and a carrying base 230. The light guide rod 220 extends from the substrate 210 along a predetermined direction and has a light incident surface 222. The carrying base 230 is connected with the light incident surface 222 and has a carrying surface 232. Moreover, the substrate 210, the light guide rod 220 and the carrying base 230 are integrated into one piece.

The light source 310 is disposed on the carrying surface 232, and the image sensing device 320 is disposed on the substrate 210. More specifically, the substrate 210 has a recess 212 and the image sensing device 320 is disposed in the recess 212. Further, the optical mouse 300 is operated on a reflective surface 50. The light source 310 is for providing a light beam 312 to the light incident surface 222 of the light guide rod 220. The light beam 312 is incident into the light guide rod 220 from the light incident surface 222, and then is guided to the reflective surface 50 by the light guide rod 220. The image sensing device 320 is for sensing the light beam 212 reflected from the reflective surface 50. Moreover, in the present embodiment, the light source 310 can be a light emitting diode (LED) or a laser diode (LD), and the image sensing device 320 can be a CMOS image sensing device or a charge coupled device, CCD.

In the lens module 200, the light incident surface 222 of the light guide rod 220 is, for example, substantially perpendicular to a bottom surface 214 of the substrate 210. Further, the light guide rod 220 can have a lens 224, and the lens 224 is disposed on the light incident surface 222 to condense the light beam 312 provided by the light source 310. Moreover, the carrying surface 232 of the carrying base 230 can be a curved surface. The shape of the curved surface should be corresponded to the shape of the light source 310, and thus the light source 310 can be engaged on the carrying surface 232.

In the present embodiment, the lens module 200, the light source 310 and the image sensing device 320 are disposed in a housing 330 of the optical mouse 300. The housing 330 includes an upper cover 332 and a base plate 334, and the upper cover 332 is combined with the base plate 334. To promote the alignment precision of the light source 310, the upper cover 332 can has a protrusion 332a to lean against the light source 310. Using the protrusion 332a and the carrying base 230 to fix the light source 310 can prevent the light source 310 from shifting, and the alignment precision of the light source 310 is consequently promoted.

Comparing to the conventional technique, in the lens module 200 of the present embodiment, the structure of the element (i.e. the carrying base 230) for fixing the light source 310 is simpler. When designing the mold, cores for the carrying base 230 and the lens 224 can be integrated, and no other sliding blocks should be used for the carrying base 230. Therefore, the structure of the mold for manufacturing the lens module 200 is simplified, the number of the sliding blocks is reduced, and the cost of the mold is consequently reduced. Moreover, the structure of the mold is simpler, so the manufacturing process of the lens module 200 becomes simpler. Therefore, the manufacturing time is reduced and the yield is promoted, and this reduces the manufacturing cost of the lens module 200. Because the manufacturing cost of the lens module 200 is reduced, the manufacturing cost of the optical mouse 300 using the lens module 200 is also reduced. Furthermore, comparing to the conventional technique, the carrying base 230 of the lens module 200 of the present embodiment is not long and thin, so the carrying base 230 is not easily broken.

Figure 4:
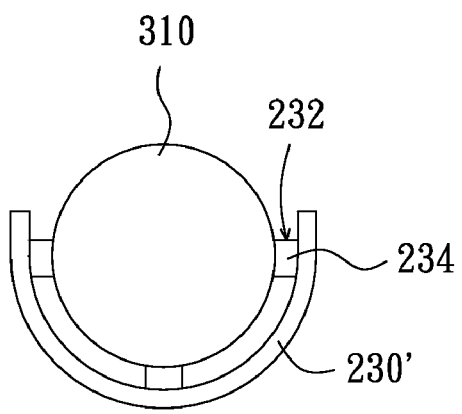
FIG. 4 is a schematic view of a carrying base of a lens module according to another embodiment of the present invention.

FIG. 4 is a schematic view of a carrying base of a lens module according to another embodiment of the present invention. Referring to FIG. 4, the carrying base 230' of the lens module of the present embodiment is similar to the carrying base 230 of FIG. 3, the difference is the carrying base 230' has a plurality of fixed pins 234 and the fixed pins 234 are disposed on the carrying surface 232. In FIG. 4, the number of the fixed pins 234 of the carrying base 230' is, for example, three. One of the fixed pins 234 is disposed on a bottom of the carrying surface 232 and the other fixed pins 234 are disposed on two sides of the carrying surface 232. The fixed pins 234 are used to further fix the light source 310 to prevent the light source 310 from shifting. It should be noted that the number of the fixed pin 234 of the present invention is not limited.

In summary, the lens module and the optical mouse of the present invention have at least the following advantages:

1. Comparing to the conventional technique, in the lens module of the present invention, the structure of the element (i.e. the carrying base) for fixing the light source is simpler, so the carrying base is easy to be manufactured. Thus, the manufacture time of the lens module can be reduced and the yield can be promoted. Therefore, the lens module and the optical mouse using the lens module of the present invention have the advantage of low manufacturing cost.

2. In the optical mouse of the present invention, the carrying base and the protrusion of the upper cover of the housing can be used to fix the light source to promote the alignment precision of the light source.

3. The fixed pins disposed on the carrying surface of the carrying base can prevent the light source from shifting.

The above description is given by way of example, and not limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A lens module for an optical mouse, the lens module comprising:
    a substrate including a bottom surface;
    a light guide rod extending from the substrate along a predetermined direction and having a light incident surface, the light incident surface substantially perpendicular to the bottom surface of the substrate; and
    a carrying base connected with the light incident surface, the carrying base having a carrying surface for carrying a light source of the optical mouse, and the substrate, the light guide rod and the carrying base being integrated into one piece.

2. The lens module as claimed in claim 1, wherein the light guide rod has a lens disposed on the light incident surface.

3. The lens module as claimed in claim 1, wherein the carrying surface is a curved surface.

4. The lens module as claimed in claim 1, wherein the carrying base has a plurality of fixed pins disposed on the carrying surface.

5. The lens module as claimed in claim 1, wherein the light guide rod is inclined relative to the bottom surface of the substrate.

6. An optical mouse, comprising:
    a lens module, comprising:
        a substrate including a bottom surface;
        a light guide rod extending from the substrate along a predetermined direction and having a light incident surface, the light incident surface substantially perpendicular to the bottom surface of the substrate; and
        a carrying base connected with the light incident surface, the carrying base having a carrying surface, and the substrate, the light guide rod and the carrying base being integrated into one piece;
    a light source disposed on the carrying surface for providing a light beam to the light guide rod, and the light beam being guided to a reflective surface outside the optical mouse by the light guide rod; and
    an image sensing device disposed on the substrate for sensing the light beam reflected from the reflective surface.

7. The optical mouse as claimed in claim 6, wherein the light incident surface is substantially perpendicular to a bottom surface of the substrate.

8. The optical mouse as claimed in claim 7, wherein the light guide rod is inclined relative to the bottom surface of the substrate.

9. The optical mouse as claimed in claim 6, wherein the light guide rod has a lens disposed on the light incident surface.

10. The optical mouse as claimed in claim 6, wherein the carrying surface is a curved surface.

11. The optical mouse as claimed in claim 6, wherein the carrying base has a plurality of fixed pins disposed on the carrying surface.

12. The optical mouse as claimed in claim 6, further comprising a housing for accommodating the lens module, the light source and the image sensing device, wherein an upper cover of the housing has a protrusion, and the protrusion is leaned against the light source.

13. An optical mouse, comprising:
 a lens module, comprising:
  a substrate;
  a light guide rod extending from the substrate along a predetermined direction and having a light incident surface, the light guide rod including a lens disposed on the light incident surface, the lens covering a central area of the light incident surface; and
  a carrying base connected with the light incident surface, the carrying base having a carrying surface, and the substrate, the light guide rod and the carrying base being integrated into one piece;
 a light source disposed on the carrying surface for providing a light beam to the light guide rod, and the light beam being guided to a reflective surface outside the optical mouse by the light guide rod; and
 an image sensing device disposed on the substrate for sensing the light beam reflected from the reflective surface.

14. The optical mouse as claimed in claim 13, wherein the light incident surface is substantially perpendicular to a bottom surface of the substrate.

15. The optical mouse as claimed in claim 14, wherein the light guide rod is inclined relative to the bottom surface of the substrate.

16. The optical mouse as claimed in claim 15, wherein the carrying base has a plurality of fixed pins disposed on the carrying surface.

* * * * *